United States Patent [19]

Johnson, Jr. et al.

[11] 4,183,028

[45] Jan. 8, 1980

[54] HIGH SPEED DATA RECORDING ARRANGEMENT

[75] Inventors: Clark E. Johnson, Jr., Weston, Mass.; William F. Main, Coral Gables, Fla.

[73] Assignee: Buckeye International, Inc., Columbus, Ohio

[21] Appl. No.: 946,849

[22] Filed: Sep. 29, 1978

[51] Int. Cl.² .......................... G01D 9/00; G11B 5/09
[52] U.S. Cl. ......................................... 346/35; 360/40
[58] Field of Search ............................ 346/35; 360/40

[56] References Cited
U.S. PATENT DOCUMENTS

| | | | |
|---|---|---|---|
| 3,131,383 | 4/1964 | Brandt | 360/40 |
| 3,815,144 | 6/1974 | Aiken | 346/35 |
| 3,881,183 | 4/1975 | Weisbecker | 360/40 |
| 4,012,746 | 3/1977 | Kugligowski et al. | 346/35 |
| 4,134,139 | 1/1979 | Rein | 360/40 X |

*Primary Examiner*—George H. Miller, Jr.
*Attorney, Agent, or Firm*—Jacobs & Jacobs

[57] ABSTRACT

An arrangement for high speed recorders to reduce the time for recording information, comprising data storage means for storing elements of information to be recorded, recording means for recording information on a recording medium, means for transmitting said elements to said recording means, said recording means being operable to record within a predetermined time duration said elements of information transmitted from said data storage means, and means for reducing the recording time operatively associated with said data transmission means and comprising means for detecting the value of an element of information transmitted from said data storage means and means for shipping said recording step when said information has a predetermined value.

7 Claims, 6 Drawing Figures

HIGH SPEED DATA RECORDING ARRANGEMENT

The present invention relates to high speed recording systems, and more particularly to systems for reducing the time for recording the information.

High speed printers are known in which the printing step is actuated by a digitized data stream. See, for example, Aiken U.S. Pat. Nos. 3,815,144 and 3,964,061. In such systems, data bits of "1" and "0" are used to instruct the printer to print and not print, respectively. When the data to be printed includes zeros which are not to be printed or recorded, it is desirable to skip the printing step for the purpose of saving operating time, and thereby increase the speed of recording the information to be printed. Thus, the printing step consumes time, and if no mark is to be recorded onto the recording medium, then it is of advantage to increase the operating time by skipping the printing step and thereby the printing time interval, whenever, for example, a zero appears in the data stream.

It is an object of the present invention to provide a high speed recording system.

It is another subject of the invention to provide an arrangement for high speed recorders in which the printing step is skipped when no marks are to be recorded by the printer.

These and other objects are fulfilled by the present invention which provides an arrangement for high speed recorders to reduce the time for recording information, comprising data storage means for storing elements of information to be recorded, recording means for recording information on a recording medium, means for transmitting said elements to said recording means, said recording means being operable to record within a predetermined time duration said elements of information transmitted from said data storage means, and means for reducing the recording time operatively associated with said data transmission means and comprising means for detecting the value of an element of information transmitted from said data storage means and means for shipping said recording step when said information has a predetermined value.

The present invention is illustrated by the accompanying drawings, in which

Figure 1:
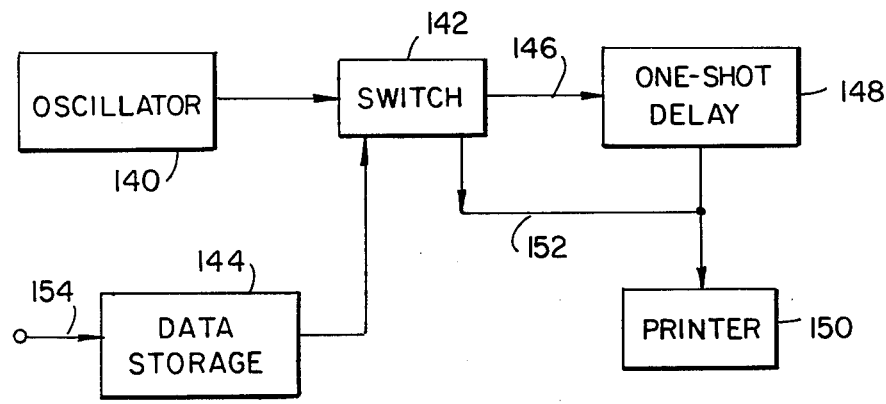
FIG. 1 is a schematic diagram of an arrangement according to the present invention for increasing the operating speed of general high-speed printers.

FIG. 1 schematically shows an arrangement for increasing the operational speed of high-speed printers. Pulses from an oscillator or pulse generator 140 are applied to a switching device 142 having two operating states. The operating state of the switching device 142 is determined by the output value of a bit or element of information from a data storage unit 144. The storage unit 144 can be in the form of a shift register, for example, which holds the information in binary code. When for example, a "1" is to be printed from the data storage 144, a pulse from the oscillator 140 is transmitted by switch 142 to line 146, so that the pulse is applied to a one-shot delay 148. The pulse from the unit 148 is applied to a printer 150 which then prints the "1" during the time interval determined by the one-shot delay unit 148.

If, on the other hand, a "0" appears as the value of an element in the data storage unit 144, then the switching device 142 transmits a pulse from the oscillator 140, directly to line 152, so that a pulse is applied directly to the printer 150 which is thereby actuated to advance the printing mechanism to the next printing position without any delay. Thus, whereas the delay unit 148 serves to provide the printer 150 with an adequate amount of time to carry out the printing process of a bit or element of information, the printer 150 is advanced substantially immediately without incurring such a delay when a "0" is to be printed.

The data storage unit 144 can be in the form of a shift register, similar to the unit 42 (FIG. 3) described hereinafter, which has applied to it shift pulses on the line 154 for the purpose of advancing the information within the unit 144 by one step or digit, each time a bit or element of information has been printed.

Figure 2:
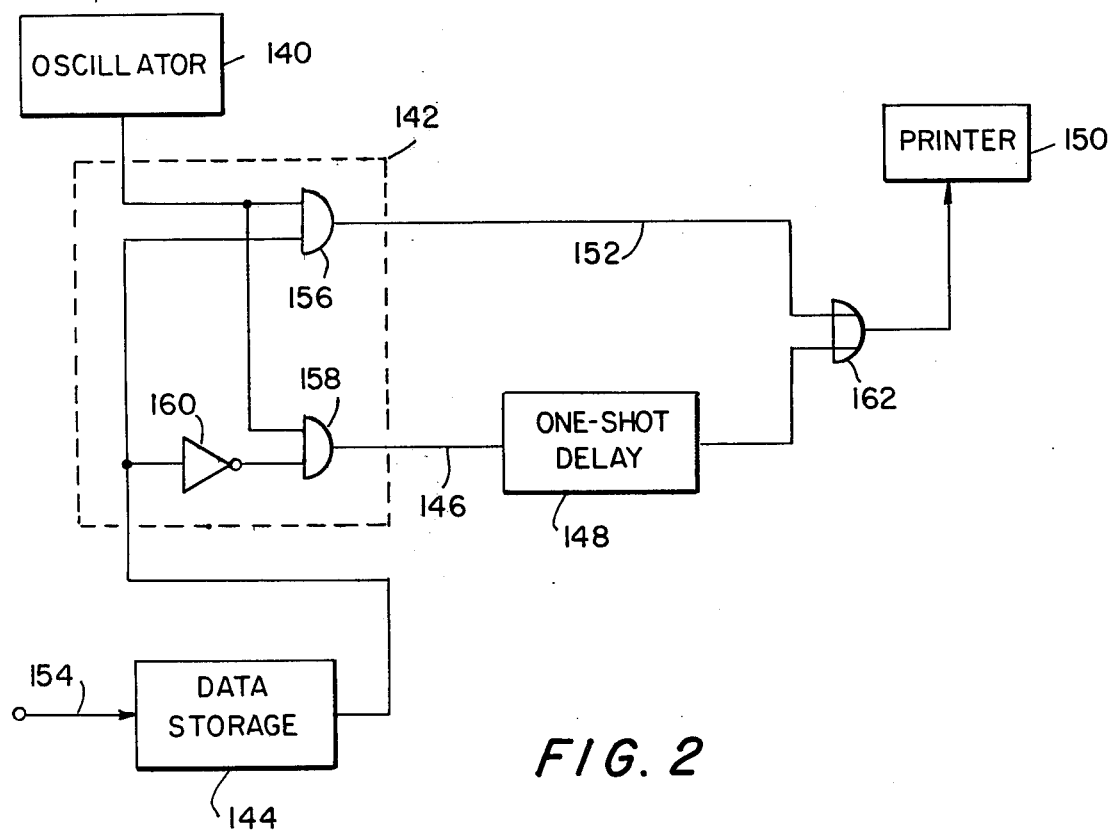
FIG. 2 is a circuit diagram of the apparatus of FIG. 1.

FIG. 2 shows the logic circuitry of the arrangement of FIG. 1 which may be used for increasing the speed of printing devices. The switching device 142 has two AND gates 156 and 158. The output of the data storage unit or shift register 144 is applied to one input of each of the gates 156 and 158. However, an inverter 160 is connected between the input to gate 158 and the output of the unit 144. The output of the oscillator 140, on the other hand, is connected directly to the second input of each of the gates 156 and 158. The output of gate 156 is applied directly to one input of an OR gate 162. The one-shot delay unit 148 is connected between the output of gate 158 and a second input of the OR gate 162.

The gates 156 and 158 are arranged so that they will conduct whenever a zero signal is applied to their first inputs and a pulse from the oscillator 140 is simultaneously applied to their second inputs. Consequently, if a "1" appears at the output of the data storage unit 144, the "1" is inverted by the inverter 160, so that this signal is converted to a "0" with respect to gate 158, which then conducts the pulse from the oscillator 140 and actuates the one-shot delay unit 148. The gate 156, on the other hand, does not conduct, since the "1" is transmitted directly to the respective input of this gate.

If, now, a "0" appears at the output of the data storage unit 144, then gate 156 conducts because the "0" is directly transmitted to the respective input of gate 156. This "0", however, is inverted by the inverter 160 so that this element of information appears as a "1" at the respective input of gate 158. As a result, gate 158 will not conduct when a "0" appears at the output of the data storage unit 144. When gate 156 conducts under these conditions, the delay unit 148 is substantially bypassed, and the pulse from the oscillator 140 is transmitted directly to the printer through the OR gate 162.

Figure 3A:
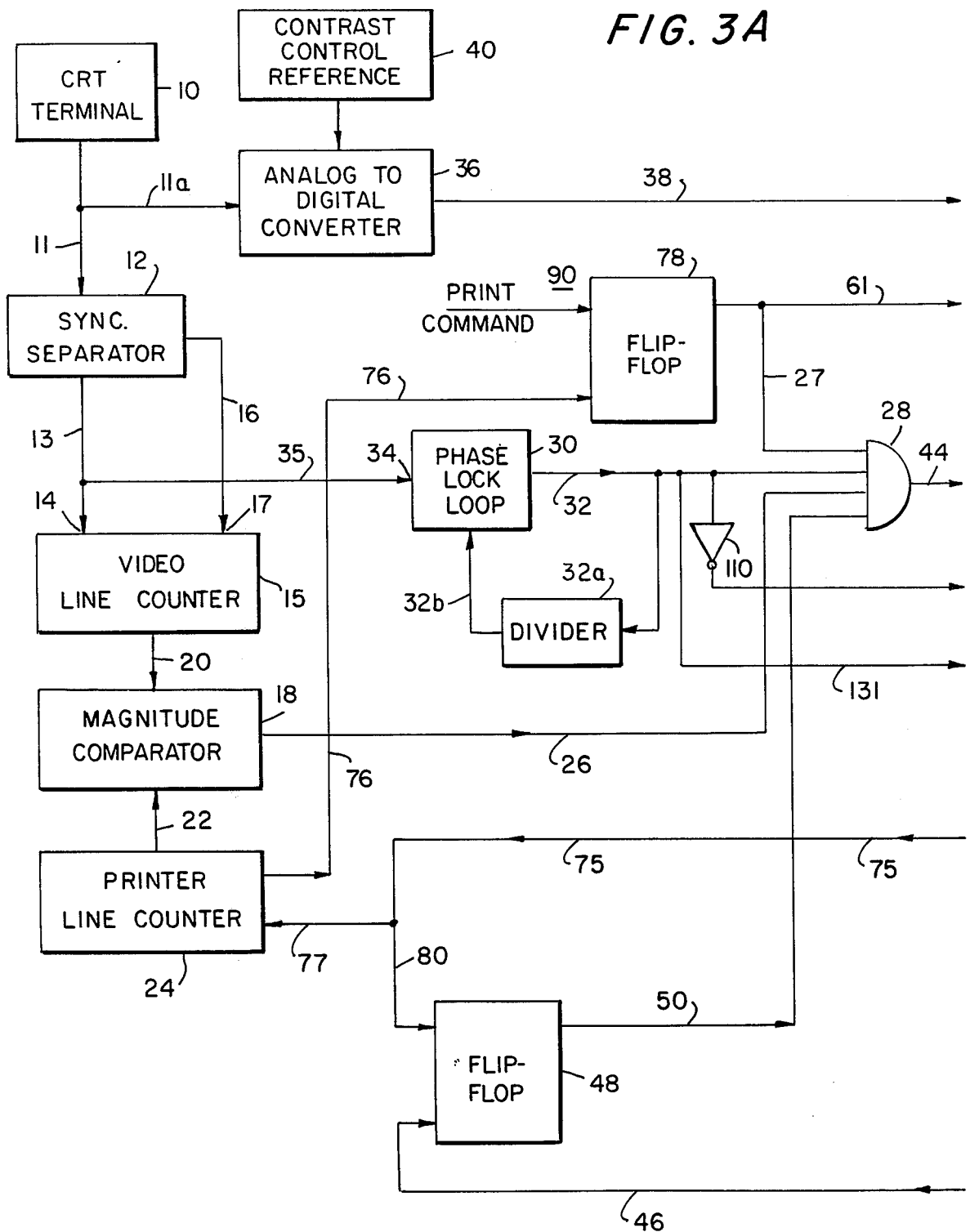
FIGS. 3A and 3B are a schematic diagram of a high speed recording system in accordance with the present invention.
Figure 3B:
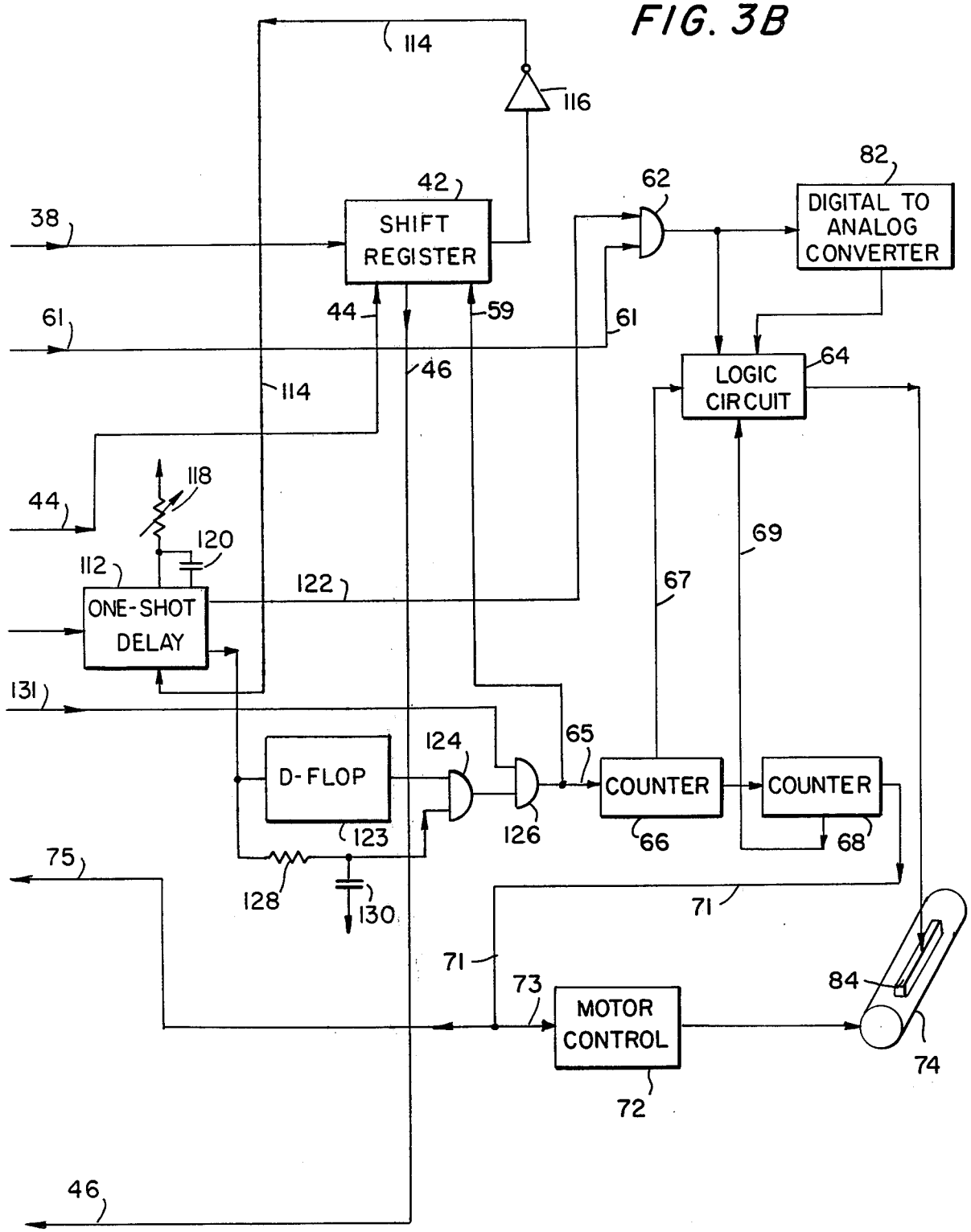

FIGS. 3A and 3B illustrate the use of the present invention in connection with apparatus for permanently recording images appearing on a cathode rag tube. Such a system is disclosed in Ser. No. 838,131 filed Sept. 30, 1977 in the names of Clark E. Johnson, Jr. and William F. Main entitled "An Arrangement for Recording Images Appearing On A Cathode Ray Tube", which is incorporated herein by reference thereto. In the system disclosed in Ser. No. 838,131, a printer that uses heat sensitive paper is described, in which digitized data are used to actuate a printer. In this system, a "1" will cause the printing head to heat the sensitive paper and cause a blackened dot to appear on the paper. A "0" on the other hand, will instruct the printing head not to heat the paper, and the paper will thus be unaffected. However, when the data bit is a "0", the printing head is idle for the same period of time as is used to print a dot on the paper, thus slowing down the printing process. In the system shown in FIGS. 3A and 3B herein, the printing operation is skipped whenever a zero appears in the data stream.

Referring now to FIGS. 3A and 3B the video signal from a cathode ray tube terminal 10 is applied via line 11 to a sync separator 12 which extracts the horizontal and vertical synchronization pulses. The sync separator 12 is a conventional circuit element found in television receivers. Counter 15 is thus advanced or incremented by one step or bit for each horizontal input pulse from the sync separator 12. The horizontal sync pulse from separator 12 is applied via line 13 to the input terminal 14 of a 264 bit capacity counter 15. The vertical sync pulse from the separator 12 is applied via line 16 to the reset terminal 17 of counter 15. Thus, the video line counter 15 receives 264 pulses per vertical frame from the sync separator 12, and is then reset by the vertical sync pulse which is applied to the reset terminal 17 at the termination of every vertical frame. Accordingly, the input 17 receives 60 pulses per second, whereas the input 14 receives 264 pulses every 1/60th of a second. With this arrangement, the video line counter 15 is always in step with the electron beam scanning the CRT of the video terminal.

The counter 15 has a 9-bit binary parallel output 20 which is applied to an input of a magnitude comparator 18. The latter has a second input which receives the output 22 of a printer line counter 24 which is advanced or incremented by one bit each time a horizontal line has been printed. The output 26 of the magnitude comparator 18 is applied to a 4-input AND gate 28. The output 26 of the magnitude comparator is designated as zero except during the time that the output 20 of the video line counter 15 equals the output 22 of the printer line counter 24. When the two counters 15 and 24 are equal, the magnitude comparator output 26 is at a high potential level. The arrangement of the counters 15 and 24 in combination with the magnitude comparator 18 determines which horizontal line is to be digitized and stored.

To subdivide each horizontal line into 256 increments, a phase-lock loop circuit 30 is provided. The latter is a conventional chip which is commercially available and has a voltage-controlled oscillator and comparator. The phase-lock loop circuit 30 provides an output clock rate which is an integral multiple of its input clock rate, as determined by divider 32a. In accordance with the embodiment of FIG. 3, the output 32 of the phase-lock loop circuit 30 provides 256 pulses for every pulse applied to its input 34 from the sync separator 12 via line 35. This is accomplished by the phase-lock loop 30 comparing the output 32b of divider 32a with the input 35 and making them equal. Consequently, the circuit element 30 functions as a frequency multiplier which provides 256 output pulses for every horizontal input pulse from the sync separator 12. The phase-lock loop circuit 30 also provides phase synchronism between input and output. Thus, the train of 256 output clock pulses is initiated with the application of the horizontal sync pulse via line 35 to the input 34 from the separator 12. The output 32 of the phase-lock loop 30 is applied to one of the four separate inputs of the AND gate 28.

The video output signal from the terminal 10 is also applied via line 11a to an analog-to-digital converter 36 having an output 38 of one or more bits representing the quantized amplitude of the video signal. The reference voltage for the analog-to-digital converter 36 is obtained from the contrast control unit 40 which sets the base line for the converter 36. If, for example, the output 38 is considered to be only of one bit in amplitude, then when the video signal is higher than the reference control voltage from the unit 40, the output 38 is a "1". If, on the other hand, the video signal is lower than the reference control voltage, the output 38 is a zero.

For every one of the 256 increments of a horizontal line, the video signal is examined by the converter 36 to determine whether the signal is higher or lower than the reference control voltage within that increment, and the result is applied to a FIFO (first-in-first-out) shift register 42. This register 42 has a 256-bit capacity, and the shifting pulses to the register 42 are applied to the input thereof from the output 44 of the AND gate 28. The output 44 of the AND gate 28 is 256 clock pulses per horizontal line of the video signal.

The precision in reproducing the video signal is determined by the number of increments into which the horizontal line is subdivided, and hence more or less than 256 increments may be employed, as desired. In each case, however, the divider 32a causes the phase-lock loop 30 to provide a number of pulses corresponding to the desired number of increments for each horizontal sync pulse applied via the input 35 to the phase-lock loop 30, and the FIFO shift register 42 has a capacity equal to the desired number of increments.

To obtain greater precision in reproducing the video signal on printed paper, furthermore, it is also possible to further quantize the amplitude of the video signal at several levels, instead of only two levels as described above. Under those conditions, the output of the converter 36 would be several bits instead of only one bit. For example, three bits at the output of the converter 36 would then provide data on eight quantized amplitude levels of the video signal. For purposes of storing the three-bit data of the output 38 from the converter 36, three FIFO shift registers, such as the unit 42, would be provided. With such further quantizing of the video signals into three binary bits, eight levels of amplitude may be obtained to provide a print gray scale.

When the FIFO shift register 42 has been filled with data, its "full" output 46 applies a reset pulse to a flip-flop 48. The output 50 of this flip-flop then goes to a low potential level that is applied to a separate input of the gate 28. As a result of this low input to the AND gate 28, no further pulses from the phase-lock loop circuit 30 can be transmitted to the FIFO shift register 42. In the illustrated embodiment, the signal output 46 from the register 42 is at a high potential level for resetting the flip-flop 48. The flip-flop 48 is set by the signal output from counter 68 via lines 71, 75 and 80, which will be described hereinafter.

Figure 4:
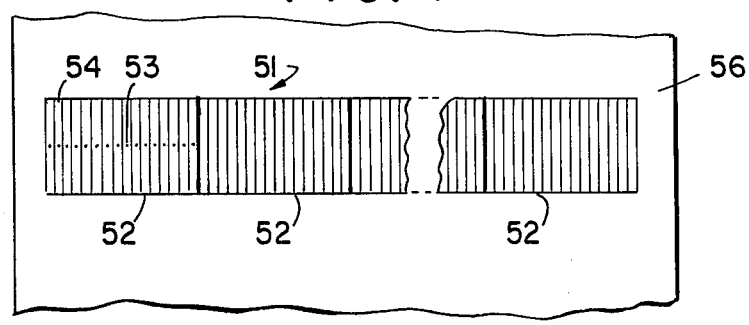
FIG. 4 is a plan view of a portion of the printing paper used in conjunction with the arrangement of FIG. 3.

To reproduce the video signal on printed paper, each data bit stored in the shift register 42 for each horizontal line is separately printed. Each line 51 (FIG. 4) to be printed on the paper 56 is, accordingly, divided into 16 main divisions 52, and each main division is further subdivided into 16 subdivisions 54. For purposes of clarification, FIG. 4 shows the main divisions 52 in heavier outline than the subdivisions 54. Each line 51 of the printed paper has, consequently, 256 subdivisions, corresponding to the data held in the 256 capacity shift register 42.

The printing paper may be a conventional heat-sensitive paper which will turn black in the area to which heat is applied, and the embodiment of FIGS. 3 and 4 is illustrated in terms of heat-sensitive paper. In the illustrated embodiment, the 256 bits of data may be recorded by 256 dots which may be spaced, for example, on 0.030-inch centers. In this manner, an entire line or row occupies approximately eight inches, so that paper of conventional width may be used. FIG. 4 shows several blackened dots 53 on the paper 56.

To print the data stored in the FIFO shift register 42, the output of phase lockloop 30, via line 131 AND gate 126 (as described hereinafter), clocks the shift register 42, and the output of the shift register is applied via one-shot delay 112 (as described hereinafter) to logic circuit 64. The logic circuit 64 is also actuated by clock pulses from the phase lock loop 30 via line 131 and gate 126 through dividing counters 66 and 68 (in this case each with a 16-bit capacity) and their respective outputs 67 and 69. Printing head 84 is an array of semi-conductor elements on a ceramic substrate, and logic circuit 64 selectively energizes a given element to cause a blackened dot to appear on the paper where the element contacts the paper.

For convenience, the array of semi-conductor elements may be envisaged as a square 16×16 array. Counter 66 effects control over selection of a given row in the array while counter 68 controls selection of a given column in the array. The logic circuit selects the proper main division 52 and subdivision 54, taken in sequence, onto which the respective output from the register 42 is to be printed. The passing of current through a given row and a given column of the matrix, for example, causes one diode isolated dot 53 within a subdivision 54 to become hot. The heated dot results in blackening of the paper 56.

In the actual embodiment illustrated in FIGS. the matrix is 256×1, instead of a matrix of 16×16, and thus the selection of a given dot for subdivision 54 requires the passing of current between one of the 16 wires (not shown) representing the respective row, and one of the 16 wires (not shown) representing the respective column of the matrix. Accordingly, 32 wires issue from the print-head array.

The output 131 of phase lock loop 30 is applied to gate 126 and they to FIFO shift register 42 via line 59 as well as the pair of cascaded divide-by-16 counters 66 and 68 via line 65. The FIFO register 42 has the characteristic feature that its input and output are independent. Thus, a bit of data inserted into the FIFO register 42 by the line 38 is ready to be delivered to the output line 60 when the output of the register 42 is pulsed by line 59 from the phase lock loop 30.

As the digitized video bits are taken from the register 42 in synchronism with the phase lock loop 30, the row and column select inputs of the divide-by-16 counters 66 and 68 cause each of these bits from the register 42 to be delivered to the appropriate print-head-array dot. If a bit is a "1", then the respective dot receives a current pulse for about 100 microseconds, which heats the paper and causes, in turn, blackening of the respective area of the paper. If a bit is a "0", the printing step is skipped as will be explained below, thus saving the 100 microsecond printing time. When 256 bits have been applied to the print-Matrix selector 64, then the counter 68 applies a high logic signal via lines 71 and 73 to the motor control unit 72 for the purpose of advancing the paper by one line. Accordingly, when the contents of the register 42 have been emptied, the paper is advanced by means of the motor 74 controlled by the unit 72. Simultaneous with the advancing of the paper, the dividing counter 68 also increments the printer line counter 24 via lines 75 and 77 so as to permit the next horizontal line of the video signal to be digitized and applied to the FIFO register 42, and sets the flip-flop 48 via lines 71, 75 and 80.

The one-shot delay 112 and the D-FLOP 112 operate to enable the system to skip the printing operation whenever a zero appears in the data stream. The phase lock loop 30 serves as a source of high frequency pulses, since this unit is substantially operating at the horizontal quantization rate and is operating at a frequency of approximately 4 mHz. the pulse train provided by the phase lock loop 30 is inverted by the inverter 110, and the positive going leading edge is applied to the input of the one-shot delay circuit 112. Connected to the reset line 114 of the one-shot delay circuit 112, is the output of the shift register 42, through an inverter 116. The one-shot delay circuit has a timing R-C network made of resistor 118 and capacitor 120. These timing elements of the R-C network determine the time constant of the one-shot.

As long as the reset line 114 of the one-shot is low, indicating a presence of a "1" in the output of the shift register 42, the printing process takes place as described above. The printing intensity is determined by the R-C time constant of the elements 118 and 120, corresponding to the time constant of the one-shot. The output 122 of the one-shot remains at a high potential for the time interval determined by the timing network 118, 120. The output 122 is then gated through AND gate 62 and into the digital-analog converter 82, as well as into the matrix decoder logic circuit 64, for purposes of carrying out the printing procedure.

When the output of the shift register 42 is a zero, indicating that the printing step is not to be carried out, the signal output of shift register 42 is inverted by the inverter 116, and as a result the one-shot delay circuit 112 is reset. With this condition, a pulse from the high frequency output of the phase lock loop 30 is transmitted through, and the zero is shifted out in one cycle time of the high frequency pulse train from the phase lock loop 30, corresponding to 250 nanoseconds. This faster mode of operation continues as long as zeroes continue to appear at the output of the shift register. As soon as a "1" appears at the output of the shift register 42, then the one-shot delay 112 is not reset and the printing process is carried out in the normal manner as described above.

To provide for synchronization of the printing interval determined by resistor-capacitor elements 118, 120, with the leading edge of the pulse from the high-frequency output of the phase lock loop 30, a delay flop 123 is provided in combination with gates 124 and 126. This circuit arrangement provides that the output of AND gate 124 is delayed before being transmitted to AND gate 126, by an interval, which ensures that the printing operation does not commence in the middle of a pulse. Thus, this circuit arrangement assures that the output of gate 126 commences at the instant of the leading edge of the pulse from the high frequency output 32 of the phase lock loop 30. The delay interval for this purpose, is established by the R-C circuit elements 128, 130 which form, respectively, a resistor-capacitor timing network.

When the last line of a frame has been printed, the counter 24 applies a reset pulse via line 76 to the print-command flip-flop 78. The resetting of this flip-flop 78 is transmitted to the AND gate 28 via line 27, which inhibits further transmission of pulses from the AND gate 28 at its output. The resetting of flip-flop 78 is also transmitted to the AND gate 62, via line 61, which prevents further signals from flowing through gate 62. The system is thus in an inoperative state until the flip-flop 78 becomes set again by applying a print command signal 90 to its input. The print command signal 90 is an ON-OFF switch that may be manually operated. When the print command signal 90 is applied to the flip-flop 78, the flip-flop 78 is set and the output signals 27 and 61 are applied to gates 28 and 62 to instruct the gates of the change of state of flip-flop 78.

If, on the other hand, it is desired to print from a high resolution cathode ray tube, e.g. having a band width of 10 mHz, then the horizontal digitization needs to be, for example, 512 bits long. Also, if interlaced scanning is required with 525 horizontal lines, for example, then the printing time is increased proportionately to approximately 35 seconds. Clearly, the image on the cathode ray tube must be held steady during the entire printing time. The modification of the components for the purpose of subdividing each horizontal line into 512 bits to obtain higher resolution has already been described above.

Figure 5:
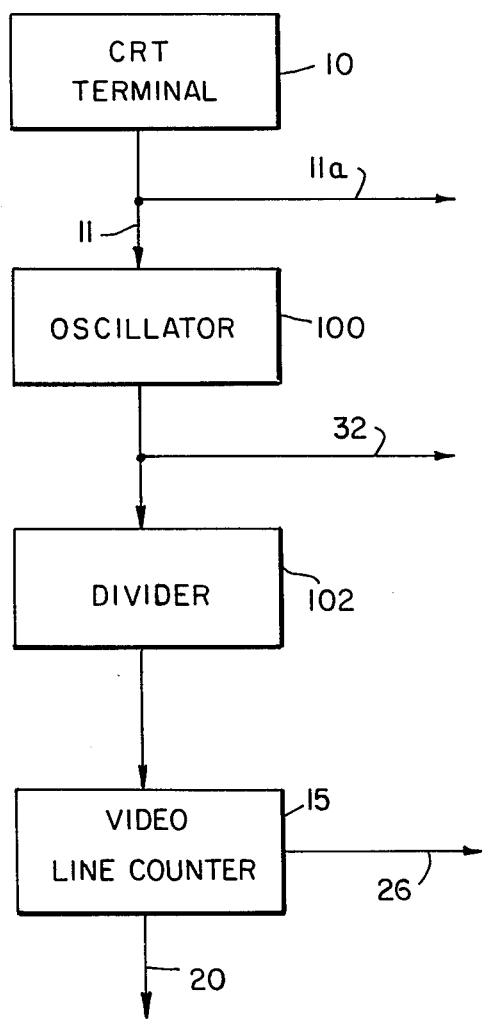
FIG. 5 is a schematic diagram of an alternative embodiment of the invention.

An alternate implementation may be required in order to achieve interlace scanned printing. Such implementation is shown in FIG. 5. In this implementation, the sync separator 12, phase lock loop 30 and divider 32a are replaced by crystal oscillator 100 and divider 102. The video signal from the CRT terminal 10 is applied via line 11 to the oscillator 100, and is also applied to the analog-to-digital converter 36 (not shown) via line 11a as in FIG. 3A. The crystal oscillator 100 is locked onto the cathode ray tube terminal horizontal frequency using standard techniques. Its frequency is determined by the product of the number of horizontal lines × the number of frames per second × the horizontal digitization. As an example, in a standard television set, the number of horizontal lines is 525 and the number of frames per second is 30. Using 256 as the horizontal digitization, the frequency of the oscillator 100 would then be 525×30×256, which is 4.032 mHz. The output of divider 102 is the horizontal line frequency of 15,750 Hz and goes into the video line counter 15. The outputs 20 and 26 of the counter 15 are applied as in FIG. 3A. The output of the crystal oscillator, 100, feeds via line 32 into the four input AND gate 28 (not shown) as in FIG. 3A. The use of a crystal oscillator has the additional benefit of reducing horizontal jitter which might from slight timing errors in the phase-lock loop and logic circuits. The result of this feature would be to cause slight horizontal displacements of the printed horizontal lines.

When the video signal is digitized so that only one bit of data is provided by the output of the converter 36, the printer will print only in terms of black and white. Shades of gray, on the other hand, may be printed when digitizing the video signal into several levels, e.g. eight levels whereby three bits are subdivided at the output of the converter 36. If these three bits of data are stored in FIFO registers which are 3 by 256 instead of 1 by 256, then eight shades of gray may be stored ranging from pure white, represented by a zero, to pure black, represented by a 7, for example. When printing takes place, three bits are shifted at a time out of the FIFO register instead of one bit, and these are reconverted into an analog signal by a digital-to-analog converter 82 which may be made part of the printer-matrix circuit. The analog signal from the output of the converter 82 is converted into a current pulse of either variable amplitude or width to heat up the properly-selected print-head-array dot so as to result in the respective shade of gray.

The transfer characteristics of the paper and print-head-array dot, i.e., the blackness of the dot as a function of current (called gamma in photographic parlance) can be accounted for by making the digital-to-analog converter 82 non-linear and matching the "gamma" curve of the thermal paper 56.

The logic circuit 64 and printing head 84 are well known in the art. The print-head in conjunction with the stepping motor 74 for advancing the heat-sensitive paper is also conventional. While any desired logic circuits and printing heads may be employed, it is preferred to use the thermal printing heads of the type shown in Aiken U.S. Pat. Nos. 3,815,144 and 3,964,061, which incorporate an array of individually energizable heat-producing elements formed in a substrate and means responsive to a digital number for energizing a selected element. The Aiken patents are incorporated herein by reference thereto.

What is claimed is:

1. An arrangement for high speed recording to reduce the time for recording information, comprising data storage means for storing elements of information to be recorded, recording means for recording information on a recording medium, means for transmitting said elements to said recording means, said recording means being operable to record within a predetermined time duration said elements of information transmitted from said data storage means, and means for reducing the recording time operatively associated with said data transmission means and comprising means for detecting the value of an element of information transmitted from said data storage means and means for skipping said recording step when said information has a predetermined value.

2. An arrangement according to claim 1, wherein said recording time reducing means comprises pulse generating means for actuating said recording means, switching means having first and second operative states connected to said pulse generating means and said detecting means, and delay means connected between said switching means and said recording means for delaying the transmission of pulses to said recording means until after said predetermined time duration said switching means being operable in said first operative state to transmit said pulses to said delay means and operable in said second operative state to transmit said pulses directly to said recording means said detecting means being operable to set said switching means to said first operative state when a transmitted element of information has other than said predetermined value and to set said switch to said second operative state when a transmitted element of information has said predetermined value.

3. An arrangement as defined in claim 2, wherein said switching means comprises a first AND gate having one input connected to said pulse generating means and having another input connected to said data storage means and a second AND gate having one input connected also to said pulse generating means and having another input; and said detecting means comprises inverter means connected between the other input of said second AND gate and said data storage means.

4. An arrangement for making a recording of an image displayed on a cathode ray tube, comprising line identifying means for identifying and recording sequentially a horizontal line of an image on said cathode ray tube to be recorded; dividing means connected to said line identifying means for dividing said horizontal line into a predetermined number of intervals; means for digitizing the amplitude of a video signal corresponding to said horizontal line within each of said intervals; data storage means connected to said amplitude digitizing means and to said dividing means for storing digitized amplitudes within each interval; recording means connected to said data storage means for recording within a predetermined time duration the digitized amplitudes transmitted from said storage means; said recording means carrying out a recording step during said predetermined time duration; and means for reducing the recording time connected to said storage means for detecting whenever a predetermined digitized amplitude is to be recorded and for skipping said recording step when other digitized amplitudes are detected.

5. An arrangement according to claim 4 wherein said recording time reducing means comprises a source of high frequency pulses for actuating said recording means, and delay means having one input connected to the output of said source of high frequency pulses and having another input connected to the output of said storage means, said delay means having an output connected to said recording means for delaying the transmission of pulses to said recording means when the output of said storage means has said predetermined digitized amplitude.

6. An arrangement according to claim 5, including first pulse inverting means between said source of high frequency pulses and said delay means; and second pulse inverting means between the output of said storage means and said other input of said delay means, said delay means comprising a one-shot delay circuit, said other input of said one-shot delay circuit being a reset input.

7. An arrangement according to claim 6 including a delay flop having a first input connected to an auxiliary output of said one-shot delay circuit and having a second input connected to the output of said first inverter means, said second input of said delay flop comprising a setting input; a first AND gate having an input connected to an output of said delay flop; pulse delay means connected between a second input of said first AND gate and the first input of said delay flop; and a second AND gate having one input connected to the output of said first AND gate and having a second input connected to the output of said source of high frequency pulses, the output of said second AND gate being connected to an input of said storage means for shifting data through said storage means.

* * * * *